United States Patent [19]

Okamoto et al.

[11] Patent Number: 4,619,970
[45] Date of Patent: Oct. 28, 1986

[54] SEPARATION AGENT

[75] Inventors: Yoshio Okamoto, Amagasaki; Koichi Hatada, Ikeda, both of Japan

[73] Assignee: Daicel Chemical Industries, Ltd., Sakai, Japan

[21] Appl. No.: 709,004

[22] Filed: Mar. 7, 1985

[30] Foreign Application Priority Data

Mar. 19, 1984 [JP]  Japan .................................. 59-53085

[51] Int. Cl.$^4$ ......................... C08F 3/36; C08G 77/12; C08G 18/04
[52] U.S. Cl. .................................... 525/100; 523/209; 525/102; 525/123; 525/342; 525/420; 525/431; 536/56; 106/163.1
[58] Field of Search ................ 525/50, 431, 54.1, 100, 525/102, 123, 342, 420; 106/163.1; 536/56

[56] References Cited

U.S. PATENT DOCUMENTS 4,375,495  3/1983  Yuki et al. ......................... 428/402
4,473,690  9/1984  Yuki et al. ......................... 526/265
4,478,953  10/1984 Yuki et al. ......................... 526/187

FOREIGN PATENT DOCUMENTS 067504  4/1985  Japan .

OTHER PUBLICATIONS

J. Am. Chem. Soc., 1981, 103, pp. 6971–6973, Okamoto et al.
Chem. Abs., 67(9) 43354u, Klabunovskii et al., (1967).
Chem. Abs., 98(22) 180661w, Daicel Chem. Ind., (1982), J57150432.

Primary Examiner—Herbert J. Lilling
Attorney, Agent, or Firm—Flynn, Thiel, Boutell & Tanis

[57] ABSTRACT

A chromatographic resolving agent made of silica gel chemically bonded with an optically active polymer having either an asymmetric carbon atom in the main chain or molecular dissymmetry causing a helical structure of the main chain thereof.

19 Claims, No Drawings

SEPARATION AGENT

The present invention relates to a chromatographic resolving agent. The molecules of optically active polymers having an optically active main chain or molecular dissymmetry in the main chain are in an asymmetric state as a whole and, therefore, they are quite useful for the resolution of optical isomers or analogous compounds. The optically active polymer has been adsorbed physically on a silica gel to improve its pressure resistance or the number of theoretical plates. However, a solution obtained by dissolving said optically active polymer in a solvent could not be used for the physical adsorption and the usable solvent was restricted in the prior art.

On the other hand, in the field of gel permeation chromatography (GPC), a crosslinked vinyl polymer has been used usually but the exchange between organic solvents having different polarities has been impossible and the usable solvents have been limited. A process has been proposed wherein a packing comprising silica gel chemically bonded with polystyrene is used for overcoming the above-mentioned defect. However, when the elution time and the exponent of the molecular weight are plotted on a graph, a linearity is recognized in only a narrow molecular weight range. Thus, this packing is unavailable for GPC.

After intensive investigations, the inventors have found that a resolving agent for the resolution of optical isomers or analogous compounds can be obtained by chemically bonding said optically active polymer with silica gel and this resolving agent can be used also as a packing for the GPC.

The present invention relates to a resolving agent comprising silica gel chemically bonded with a polymer which is optically active due to the presence of an asymmetric carbon atom in the main chain or the molecular dissymmetry of the main chain.

The silica gel used in the present invention is that used usually. Though the particle size of the silica gel varies depending on the sizes of columns and plates used, it is generally 1 μm to 10 mm, preferably 1 to 300 μm. The silica gel is preferably porous and has an average pore diameter of 10 Å to 100 μm, preferably 50 to 50,000 Å. The amount of the optically active polymer to be chemically bonded with the silica gel is 0.1 to 100 wt. %, preferably 1 to 50 wt. % based on the carrier.

The optically active polymers herein include polyamino acids, polysaccharides, polysaccharide derivatives and optically active, synthetic high-molecular compounds. The optically active, synthetic high-molecular compounds may be polymers having an asymmetric carbon atom in the main chain or those having molecular dissymmetry of the main chain. The polymers having molecular dissymmetry of the main chain are, for example, those comprising the following main polymerizable monomers:

FIG. 1

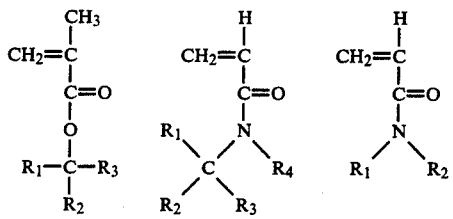

wherein $R_1$, $R_2$ and $R_3$ may be the same or different and represent each

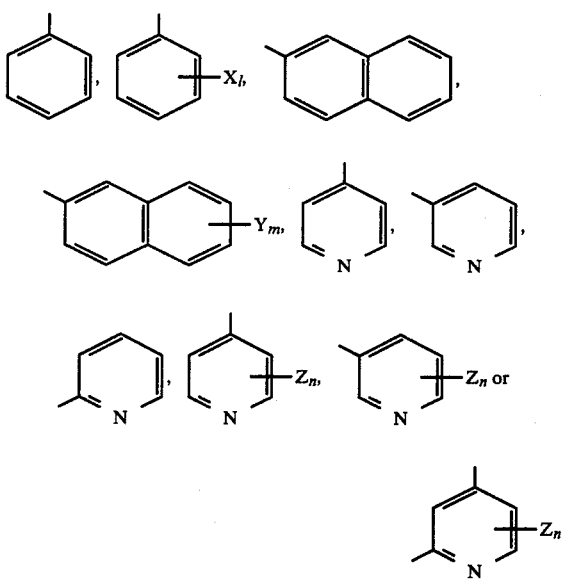

X, Y and Z represent each an alkyl group, a halogen or amino group, l, m and n represent each a number of substituents in the range of 1 to 5 and $R_4$ represents an alkyl group having up to 4 carbon atoms.

In the production of the optically active polymer by the polymerization of the above-mentioned polymerizable monomer, an initiator comprising an anionic compound is mixed with a dehydrated and dried asymmetric ligand compound in an amount equimolar to or a little greater than that of the initiator in a solvent such as a hydrocarbon solvent to form a complex and the resulting complex is used as a polymerization catalyst. Processes disclosed in, for example, the specifications of Japanese Patent Applications Nos. 036909/1982 and 176473/1983 may be employed.

Polymers having an asymmetric carbon atom in the main chain include polyamino acids, polysaccharides such as cellulose and derivatives of them.

The optically active polymer may be chemically bonded with silica gel by the following processes:

| silica gel | chemical bond | silane treating agent | chemical bond | spacer | chemical bond | optically active polymer |
|---|---|---|---|---|---|---|
| order of the reactions | 1 | | 2 | | 3 | process 1 |
| | 3 | | 2 | | 1 | process 2 |
| | 1 | | 3 | | 2 | process 3 |

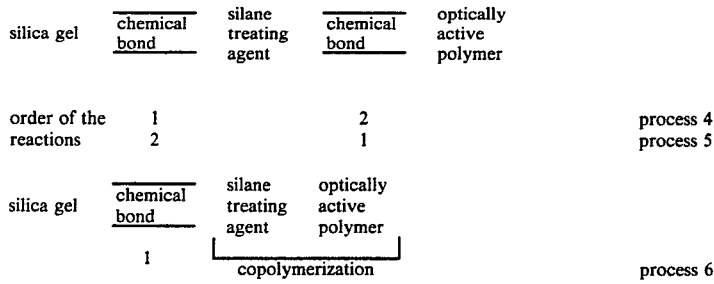

| | | | | |
|---|---|---|---|---|
| silica gel | chemical bond | silane treating agent | chemical bond | optically active polymer |

| order of the reactions | 1 2 | 2 1 | | process 4 process 5 |

| silica gel | chemical bond | silane treating agent | optically active polymer |
| 1 | | copolymerization | | process 6 |

In processes 1 to 3, a spacer is interposed between a silane treating agent and an optically active polymer. The difference among them resides in the order of the arrangement of chemical bonds. More particularly, in the process 1, silica gel is reacted with a silane treating agent having an amino, monosubstituted amino, hydroxyl, or mercapto group by a known method to attach the amino, monosubstituted amino, hydroxyl or mercapto group on the surface of the silica gel, the product is then reacted with a part of the isocyanato group of a polyfunctional isocyanate derivative as a spacer to attach the isocyanato group on the silica gel, and the product is chemically bonded with an optically active polymer having an active hydrogen group such as an amino, monosubstituted amino, hydroxyl or mercapto group to form a urea, urethane, or thiourethane bond.

In the process 2, a part of the isocyanato group in the polyfunctional isocyanate derivative used as the spacer is reacted with an optically active polymer having an active hydrogen group such as an amino, monosubstituted amino, hydroxyl or mercapto group to form a urea, urethane, or thiourethane bond. Then, the optically active polymer having an unreacted isocyanato group is reacted with a silanol group of the silica gel to chemically bond the silica gel with the optically active polymer.

The process 3 may be carried out in the same manner as above. The spacers which may be used include, in addition to the polyfunctional isocyanate derivative, a polyfunctional compound reactive with both the silane treating agent and the optically active polymer. For example, a polyfunctional acid chloride derivative is also preferred.

The process 4 comprises chemically bonding the surface of silica gel with a silane treating agent having a cyclic ether group or halogen and further reacting the resulting product with an optically active polymer having an active hydrogen group such as an amino, monosubstituted amino, hydroxyl or mercapto group to chemically bond the silica gel with the optically active polymer.

The process 5 comprises reacting an optically active polymer having an active hydrogen group such as an amino, monosubstituted amino, hydroxyl or mercapto group with a silane treating agent having a cyclic ether group or halogen, reacting the resulting product with a silanol group on the surface of a silica gel and chemically bonding the product with an optically active polymer.

In the processes 1 to 5, the optically active polymer should have a functional group reactive with the silane coupling agent or spacer.

The process 6 is employed particularly when a polymerizable monomer having a vinyl group is used. In this process, a polymerizable monomer capable of forming an optically active polymer is copolymerized with a silane treating agent having a vinyl group and the product is chemically bonded with a silica gel. The copolymer is preferably a block copolymer. The polymerization may be effected by a process disclosed in the specification of Japanese Patent Application No. 036909/1982 or 176473/1983.

The reaction of the silica gel with the optically active polymer containing the silane treating agent is effected by a conventional process for the reaction of a silica gel with a silane treating agent. This reaction cannot be effected in a solvent in which the optically active polymer is insoluble.

The polyfunctional isocyanate derivatives which act as the spacer for forming the chemical bond may be either aliphatic or aromatic polyfunctional isocyanates. Examples of them include 2,4-toluene diisocyanate, 2,6-toluene diisocyanate, hexamethylene-1,6-diisocyanate, tetramethylene-1,4-diisocyanate, cyclohexane-1,4-diisocyanate, naphthalene-1,5-diisocyanate, diphenylmethane- 4,4'-diisocyanate, xylene diisocyanate, hexahydroxylylene diisocyanate, dicyclohexylmethane-4,4'-diisocyanate, 1,4-benzenediisocyanate, 3,3'-dimethoxy-4,4'-diphenyl diisocyanate, m-phenylene diisocyanate, isophorone diisocyanate, polymethylene polyphenyl isocyanate, 4,4'-biphenylene diisocyanate, 4-isocyanatocyclohexyl-4'-isocyanatophenylmethane and p-isocyanatomethylphenyl isocyanate.

The polyfunctional acid chloride derivatives may be either aliphatic or aromatic compounds. Examples of them include those corresponding to the above-mentioned polyfunctional isocyanates but containing an acid chloride group in place of the isocyanato group.

The silane treating agents used in the present invention are preferably those available on the market as silane coupling agents. They are represented by the following general formulae:

silane treating agents having amino group(s):

$$(HN-R_1)_{\overline{n}}SiX_{(4-n)} \quad \overset{R_2}{\underset{|}{}}$$

silane treating agents having hydroxyl group(s):
$$(HO-R_1)_{\overline{n}}SiX_{4-n}$$

silane treating agents having mercaptan group(s):
$$(HS-R_1)_{\overline{n}}SiX_{(4-n)}$$

silane treating agents having cyclic ether group(s):

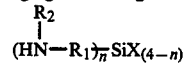

silane treating agents having halogen(s):

-continued $$(Y-R_1)_{\overline{n}}SiX_{(4-n)}$$

silane treating agents having vinyl group(s):

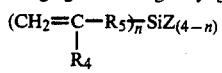

wherein the symbols have the following meaning:
- n: an integer of 1 to 3, preferably 1,
- $R_1$: a hydrocarbon group or its derivative having 1 to 30 carbon atoms,
- $R_2$: a hydrocarbon group or its derivative having 1 to 30 carbon atoms,
- $R_3$: a hydrocarbon group or its derivative having 1 to 30 carbon atoms,
- $R_4$: hydrogen or a hydrocarbon group having 1 to 6 carbon atoms,
- $R_5$: a group having an ester, ether, amido or urethane bond and an aromatic moiety,
- X: at least one of X is a halogen atom or an alkoxy group having 1 to 5 carbon atoms,
- Y: a chlorine, bromine or fluorine atom, the chlorine being most preferred,
- Z: at least one of Z is an alkoxy group having 1 to 5 carbon atoms The resolving agent of the present invention can be used in the chromatography for the resolution of low-molecular compounds such as optical isomers and analogous compounds. It can also be used as a packing for GPC in the determination of the molecular weight of high-molecular compounds and in the resolution of optically active polymers.

Since the optically active polymer is chemically bonded with the silica gel, any solvent which does not chemically decompose the optically active polymer or which does not react with said polymer may be used. The packing is suitable for use in chromatography.

The following examples will further illustrate the present invention.

EXAMPLE 1

(The Above-Mentioned Process 1)

10 g of commercially available silica gel having a pore diameter of 300, 1000 or 4000 Å was dried under vacuum at 180° C. for 2 h. Air in the reaction vessel containing the silica gel was replaced with nitrogen 100 ml of benzene (dried over metallic sodium), 1 ml of pyridine and 2 ml of γ-aminopropyltriethoxysilane were added thereto and the mixture was heated to 80° C. under reflux overnight.

The obtained silica gel/benzene was added to 400 ml of methanol. After decantation repeated several times, the reaction mixture was filtered through a glass filter by suction.

After drying under vacuum at 60° C. for 2 h, the product was reacted with PTrMA.

The results of elementary analysis of the respective silica gels are shown in the following table:

| Silica gel | Pore diameter (Å) | Particle diameter (μm) | C (%) | H (%) | N (%) |
|---|---|---|---|---|---|
| Develosil ® (Nomura Kagaku Co.) | 100 | 5 | 4.25 | 1.01 | 0.83 |
| Develosil ® (Nomura Kagaku Co.) | 300 | 10 | 2.07 | 0.55 | 0.35 |
| LiChrospher ® | 1000 | 10 | 0.52 | 0.15 | — |
| (Merck) LiChrospher ® (Merck) | 4000 | 10 | 0.23 | 0.07 | 0.09 |

The polymerization reaction was effected to obtain an optically active polymer. The polymerization reaction was carried out in a dry nitrogen stream in all the cases.

12.0 g of triphenylmethyl methacrylate (TrMA) was placed in a polymerization tube. 240 ml of toluene was introduced therein by vacuum distillation to dissolve the methacrylate and the solution was cooled to −78° C. A (+)DDB complex of N,N-diphenylethylenediamine monolithiumamide as an initiator was added to the solution in such an amount that the ratio of [monomer] to [initiator] would be 20 and the polymerization reaction was effected at −78° C. for 17 h. The polymerization reaction was terminated with a small amount of methanol. The reaction mixture was poured into 2 l of methanol. The resulting mixture was left to stand, decanted and fractionated in a centrifugal separator. Finally, the product was dried under vacuum at 60° C. for 2 h.

yield: 100% specific rotatory power $[\alpha]_D^{25}: +307°$ (in tetrahydrofuran).

The resulting polymer was reprecipitated from 1.2 l of a mixture of benzene and hexane (1:1) to fractionate the same into soluble and insoluble parts.

Polytriphenylmethyl methacrylate [PTrMA, specific rotatory power $[\alpha]_D^{25} + 367$ (in tetrahydrofuran)] was obtained from the insoluble part in a yield of 85.9%.

The symbol (+)-DDB refers to (2S,3S)-(+)-2,3-dimethoxy-1,4-bis(dimethylamino)butane.

3.5 g of the silica gel surface-treated as above was added to a mixture of 10 ml of toluene, 1 ml of tolylene 2,4-diisocyanate and 0.5 ml of pyridine. The mixture was heated to 70° C. for 3 h and then filtered through a glass filter while nitrogen was introduced therein. Unreacted tolylene-2,4-diisocyanate was washed away thoroughly with toluene.

On the other hand, 600 mg of PTrMA obtained by the polymerization as described above was dissolved in 10 ml of tetrahydrofuran (THF). The silica gel collected as described above was added to the solution and the mixture was heated under reflux for 10 h. After the heating, the mixture was filtered again through a glass filter by suction. Unreacted PTrMA was washed away with THF. After washing the silica gel with benzene to prevent the adsorption of the stabilizer contained in THF on the silica gel, it was used as a packing for a high-performance liquid chromatography.

EXAMPLE 2

(Process 2)

600 mg of the same PTrMA as in Example 1 was dissolved in 10 ml of THF. 0.05 ml of tolylene-2,4-diisocyanate was added to the solution and the mixture was heated to 40° C. under stirring for 10 h. 3.5 g of silica gel having a pore diameter of 100 or 1000 Å which had been surface-treated in the same manner as in Example 1 was added to said mixture. The resulting mixture was left to stand at room temperature for 2 h and then heated under reflux for an additional 2 h. After completion of the reaction, the silica gel was collected and washed in the same manner as in Example 1. The silica gel was used as a packing.

EXAMPLE 3

(Process 6)

The polymerization reaction was carried out always in a dry nitrogen stream. 3.00 g of TrMA was dissolved in 60 ml of toluene and the solution was cooled to $-78°$ C. A (+)-DDB complex of N,N-diphenylethylenediamine monolithiumamide as an initiator was added to the solution in such an amount that the ratio of [monomer] to [initiator] would be 20 and the polymerization reaction was effected at $-78°$ C. for 2 h. A solution of a silyl monomer in toluene having a ratio of [TrMA] to [3-trimethoxysilylpropyl methacrylate] of 5 was added to the reaction mixture to effect the block copolymerization at $-78°$ C. for 39 h. The reaction was terminated by pouring the mixture into 600 ml of benzene/hexane (1:1). The termination and the fractionation were effected simultaneously. After leaving to stand followed by decantation and centrifugal separation, the product was dried under vacuum at 60° C. for 2 h.

benzene/hexane (1:1)-insoluble part
yield: 95.5%
specific rotatory power $[\alpha]_D^{25}$: $+312°$ (in THF).

From the results of the determination of the molecular weight and the H'-NMR, it was confirmed that the obtained polymer comprised 50 TrMA monomer units block-copolymerized with about 7 silyl monomer units.

400 mg of the block copolymer was dissolved in 15 ml of THF. 0.1 ml of pyridine was added to the solution. The solution was added to 3.5 g of a silica gel having a pore diameter of 100 or 1000 Å which had been dried under vacuum at 180° C. for 2 h and the resulting mixture was heated under reflux overnight. After completion of the reaction, the silica gel was collected and washed in the same manner as in Example 1 and it was used as a packing.

Application Example 1

The packing obtained in Example 1, 2 or 3 was shaken well together with a mixture of methanol and ethylene glycol (2:1) and then subjected to an ultrasonic treatment to obtain a dispersion. The dispersion was placed in a column by a slurry-charging method. The column had an inner diameter of 0.46 cm and a length of 25 cm.

TRI ROTOR-II (a product of Nihon Bunko Kogyo Co.) was used in the high-performance liquid chromatography. Detectors used were UVIDEC-100-III (a U.V. absorption measurement device of Nihon Bunko Kogyo Co.) and DIP-181 C [cell: 5×0.30 (i.d.) cm] (a polarimeter of Nihon Bunko Kogyo Co.).

The column prepared and the number of theoretical plates for acetone using methanol solvent are shown in Table 1.

TABLE 1

| | | Column and number of theoretical plates | | | |
|---|---|---|---|---|---|
| | | Silica gel | | PTrMA | |
| Column No. | Example | Pore diameter (Å) | Particle diameter (μm) | Silica gel (wt. %) | Number of theoretical plates |
| 1 | 1 | 300 | 10 | 4.3 | 7200 |
| 2 | 1 | 1000 | 10 | 4.8 | 7500 |
| 3 | 1 | 4000 | 10 | 0.73 | 6600 |
| 4 | 2 | 100 | 5 | 2.9 | 8100 |
| 5 | 2 | 1000 | 10 | 2.5 | 2700 |
| 6 | 3 | 100 | 5 | 7.7 | 7000 |
| 7 | 3 | 1000 | 10 | 8.1 | 4500 |

(Note) wt. % was determined by the elementary analysis.

The columns of the chemical bonding type of the present invention had relatively high numbers of theoretical plates, while similar columns of physical adsorption type used in the prior art had about 5000 plates.

Application Example 2

2,2-Dimethyl-1,1-binaphthyl was optically resolved using methanol as a solvent in column No. 7 obtained in Example 3. The resolution factor $\alpha$ was 1.59 and the degree of resolution $R_3$ was 2.33. The results of the resolution were superior to those obtained using a column of 23 wt. % of PTrMA physically adsorbed on the silica gel under the same conditions.

Application Example 3

(±)-PTrMA was optically resolved by using chloroform as an eluent in a solvent system which cannot be used in the physically adsorbed PTrMA packing in the column No. 7. By the measurement with a polarimeter, it was found that (−)-PTrMA was eluted first and then (+)-PTrMA was eluted. This fact suggested that it can be used in the resolution of an optically active polymer.

Polystyrene having a known molecular weight was treated under the same conditions as above. The elution time and the exponent of the molecular weight in a wide molecular weight range of 2500 to 1,000,000 were plotted on a graph. A linear relationship was recognized between them. Thus, it was found that this column was usable also in gel permeation chromatography.

EXAMPLE 4

(Processes 1 and 3 Wherein the Reactions (2) and (3) are Carried Out Simultaneously)

1.51 parts of cellulose, 2.27 parts of LiCl and 23 parts of N,N-dimethylacetamide were mixed together and the mixture was kept at 80° C. for 10 h. 10 parts of pyridine and 21.2 parts of trityl chloride were added thereto and the reaction was carried out for 48 h. The product was precipitated from methanol, washed and dried under vacuum (yield: 4.17 parts). 0.75 part of the resulting 6-O-tritylcellulose was dissolved in 10 parts of chloroform and the solution was added to 3.00 parts of silica gel treated with 3-aminopropyltriethoxysilane in two portions to carry the former on the latter.

| Elementary analysis of silica gel carrying tritylcellulose: | | |
|---|---|---|
| C % | H % | N % |
| 15.40 | 1.23 | 0.09 |

30 parts of methanol and 0.3 part of conc. hydrochloric acid were added to the silica gel and the mixture was left to stand at room temperature. After 25 h, the product was collected by filtering through a No. 4 glass filter and washed with methanol. The solvent was distilled off from the filtrate to obtain 0.545 part of yellowish brown crystals. According to IR spectrum, the product was identified as triphenylcarbinol.

The silica gel collected on the glass filter was transferred into an eggplant-shape flask. A mixture of methanol and triethylamine (30 ml:0.3 ml) was added thereto to remove the hydrochloride. The residue was filtered again through a No. 4 glass filter. The filter cake was washed with methanol and dried to obtain a packing comprising a cellulose-carrying silica gel.

| Elementary analysis of the packing from which the trityl group had been removed: | | |
|---|---|---|
| C % | H % | N % |
| 3.61 | 0.60 | — |

The packing was placed in a eggplant-shape flask and dried. After purging with nitrogen, dry toluene was mixed with 0.062 part of tolylene-2,4-diisocyanate in a nitrogen stream. The mixture was added to the silica gel. In this stage, an absorption due to —NCO was recognized in the IR spectrum of the silica gel. 2 ml of pyridine was added thereto and the mixture was heated to 60°-70° C. The absorption due to —NCO in the IR spectrum of the silica gel disappeared and absorption due to $$-\text{NH}\overset{\text{O}}{\underset{\|}{\text{C}}}-$$

appeared.

EXAMPLE 5

20 parts of pyridien and 2 parts of phenyl isocyanate were added to the modified silica gel obtained in Example 4 and the mixture was heated to about 110° for 17.5 h. The reaction mixture was filtered through a No. 4 glass filter to collect the silica gel, which was then transferred into an eggplant-shape flask. Tetrahydrofuran was added thereto and the mixture was subjected to an ultrasonic treatment. After being left to stand followed by the decantation, an absorption due to the polymer was recognized in the UV spectrum of the wash solution. The product was washed with tetrahydrofuran until said absorption disappeared. Thereafter, the product was washed with chloroform several times.

| Elementary analysis of the packing: | | |
|---|---|---|
| C % | H % | N % |
| 3.23 | 0.27 | 0.45 |

It is understood from the results of the elementary analysis that about 5 wt. % of the optically active polymer (cellulose triphenylcarbamate) was chemically bonded with the silica gel.

Application Example 4

The packing obtained in Example 5 was placed in a column of 25×0.46 (i.d.) cm and its resolving power was examined.
Analysis conditions
 eluent: hexane/2-propanol (9:1)
 flow rate: 0.5 ml/min,
 temperature: 25° C.
 results of the resolution:

| Racemic compound | $k_1'$ | α | $R_c$ |
|---|---|---|---|
|  | 0.19(+) | 1.28 | 0.59 |
| 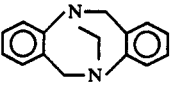 —CONHPh<br>—CONHPh | 0.45(+) | 1.20 | 0.57 |
|  —Ph<br>—CONHPh | 1.12(−) | 1.37 | 1.32 |
| 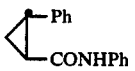 —CONHPh<br>—CONHPh | 0.10(+) | 1.62 | 0.56 |
| Cr(acac)₃ | 0.68(−) | 1.20 | 0.50 |
| 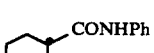 | 0.29(−) | 1.53 | 1.21 |
| 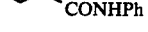 | 0.58(−) | 1.42 | 0.97 |
| 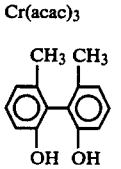 | 0.26 | 1.36 | 1.16 |
| 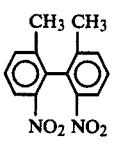 | 1.91(−) | 1.20 | 1.05 |
| 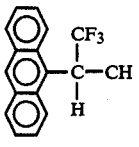 | 2.48 | 1.34 | 0.89 |

What is claimed is:

1. A resolving agent for use in chromatographic separation processes, which comprises: silica gel treated with a silane treating agent having an amino, monosubstituted amino, hydroxyl or mercapto group, said silane-treated silica gel being reacted with a polyfunctional organic compound selected from the group consisting of polyfunctional isocyante derivatives and polyfunctional acid chloride derivatives whereby to react a portion of the functional groups of said polyfunctional organic compound with said silica gel, said polyfunctional organic compound also being reacted with an optically active polymer having a functional group reactive with said polyfunctional organic compound whereby to form a bond between said optically active polymer and said polyfunctional organic compound.

2. A resolving agent as claimed in claim 1 wherein said polyfunctional organic compound is selected from the group consisting of 2,4-toluene diisocyante, 2,6-toluene diisocyanate, hexamethylene-1,6-diisocya nate, tetramethylene-1,4-diisocyante, cyclohexane-1,4-disocyante, naphthalene-1,5-diisocyante, diphenylmethane-4,4'-diisocynate, xylene diisocyante, hexahydroxylylene diisocyante, dicyclohexylmethane-4,4'-diisocyanate, 1,4-benzenediisocyante, 3,3'-dimethoxy-4,4'-diphenyl diisocyante, polymethylene polyphenyl isocyante, 4,4'-bephenylene diisocyanate, 4-isocyanatocyclohexyl-4'-isocyanatophenylmethane and p-isocyanatomethylphenyl isocyanate and the corresponding compounds in which the isocyanto groups are replaced by acid chloride groups.

3. A resolving agent as claimed in claim 2 in which said silane treating agent is selected from the group consisting of compounds having the formulas

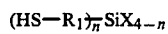

wherein n is an integer of 1 to 3, $R_1$ is a hydrocarbon group having 1 to 30 carbon atoms, $R_2$ is a hydrocarbon group having 1 to 30 carbon atoms and X is halogen or alkoxy having 1 to 5 carbon atoms.

4. A resolving agent as claimed in claim 3 in which said silica gel has a particle size of from 1 μm to 10 mm and the amount of said optically active polymer is from 1 to 100 wt %, based on the weight of the silica gel.

5. A resolving agent as claimed in claim 3 in which said resolving agent has been prepared by reacting said silane-treated silica gel with said polyfunctional organic compound to obtain a first reaction product and then reacting said first reaction product with said optically active polymer.

6. A resolving agent as claimed in claim 3 in which said resolving agent has been prepared by reacting said polyfunctional organic compound with said optically active polymer to obtain a second reaction product and then reacting said second reaction product with said silane-treated silica gel.

7. A resolving agent as claimed in claim 3 in which said optically active polymer has an asymmetric carbon atom in the main chain thereof.

8. A resolving agent as claimed in claim 3 in which the bond between said optically active polymer and said polyfunctional organic compound is a urea, urethane or thiourethane bond.

9. A resolving agent as claimed in claim 3 in which said optically active polymer has been prepared by polymerizing a monomer selected from the group consisting of

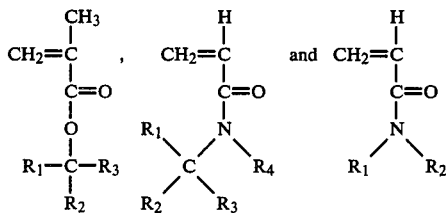

wherein $R_1$, $R_2$ and $R_3$ are the same or different and are selected from the group consisting of

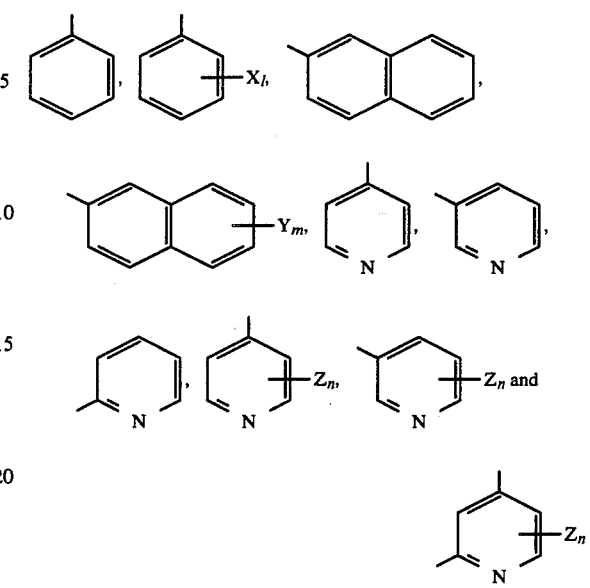

X, Y and Z is alkyl, halogen or amino, l, m and n each is an integer of 1 to 5 and $R_4$ is alkyl having up to 4 carbon atoms.

10. A resolving agent for use in chromatographic separation processes, which comprises: silica gel treated with a silane treating agent having a cyclic ether group or halogen, said silane-treated silica gel also being reacted with an optically active polymer having a functional group containing an active hydrogen which is reactive with silane-treated silica gel whereby to form a bond between said optically active polymer and said silane-treated silica gel.

11. A resolving agent as claimed in claim 10 in which said silane treating agent is selected from the group consisting of compounds having the formulas

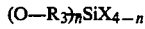

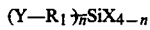

wherein n is an integer of 1 to 3, $R_1$ is a hydrocarbon group having 1 to 30 carbon atoms, $R_3$ is a hydrocarbon group having 1 to 30 carbon atoms, Y is chlorine, bromine or fluorine and X is halogen or alkoxy having 1 to 5 carbon atoms.

12. A resolving agent as claimed in claim 11 in which said silica gel has a particle size of from 1 μm to 10 mm and the amount of said optically active polymer is from 1 to 100 wt. %, based on the weight of the silica gel.

13. A resolving agent as claimed in claim 10 in which said resolving agent has been prepared by reacting said silane-treated silica gel with said optically active polymer.

14. A resolving agent as claimed in claim 10 in which said resolving agent has been prepared by reacting said silane treating agent with said optically active polymer to obtain a first reaction product and then reacting said reaction product with said silica gel.

15. A resolving agent as claimed in claim 10 in which said optically active polymer has an asymmetric carbon atom in the main chain thereof.

16. A resolving agent as claimed in claim 10 in which said optically active polymer has been prepared by polymerizing a monomer selected from the group consisting of

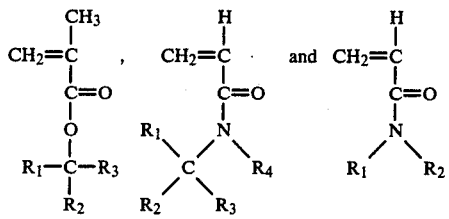

wherein $R_1$, $R_2$ and $R_3$ are the same or different and are selected from the group consisting of

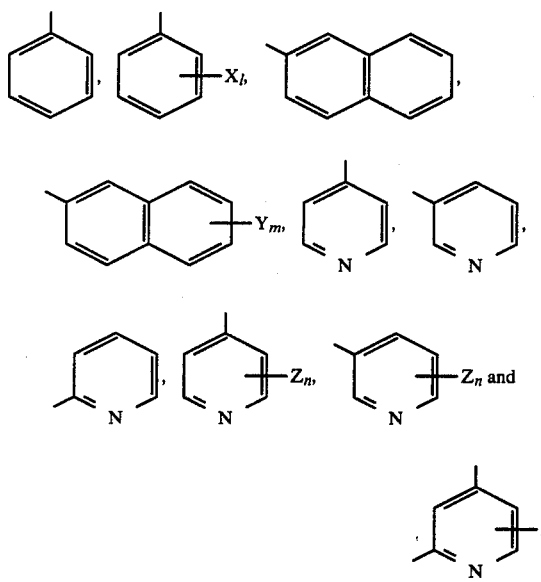

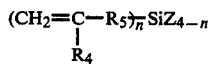

X, Y and Z is alkyl, halogen or amino, l, m and n each is an integer of 1 to 5 and $R_4$ is alkyl having up to 4 carbon atoms.

17. A resolving agent for use in chromatographic separation processes, which comprises: silica gel treated with a copolymer prepared by copolmerizing (A) a compound having the formula $$(CH_2=C-R_5)_{\overline{n}} SiZ_{4-n}$$
$$\phantom{(CH_2=C-}R_4$$

wherein n is integer of 1 to 3, $R_4$ is hydrogen or hydrocarbon having 1 to 6 carbon atoms, $R_5$ is a group having an ester, ether, amido or urethane bond and an aromatic moiety, Z is alkoxy having 1 to 5 carbon atoms, and (B) a polymerizable monomer capable of forming an optically active polymer whereby to form a chemical bond between said silica gel and said optically active polymer.

18. A resolving agent as claimed in claim 17 in which said optically active polymer has an asymmetric carbon atom in the main chain thereof.

19. A resolving agent as claimed in claim 17 in which said monomer is selected from the group consisting of

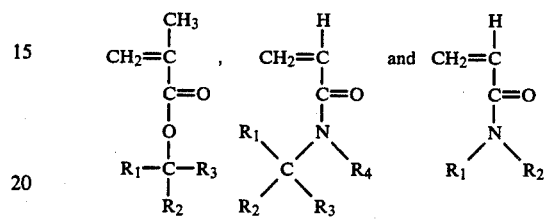

wherein $R_1$, $R_2$ and $R_3$ are the same or different and are selected from the group consisting of

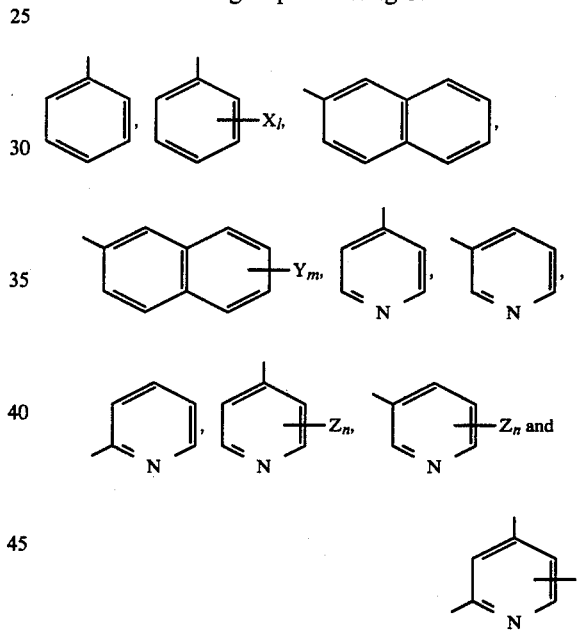

X, Y and Z is alkyl, halogen or amino, l, m and n each is an integer of 1 to 5 and $R_4$ is alkyl having up to 4 carbon atoms.

* * * * *

UNITED STATES PATENT AND TRADEMARK OFFICE
CERTIFICATE OF CORRECTION

PATENT NO. : 4,619,970
DATED : October 28, 1986
INVENTOR(S) : Yoshio OKAMOTO et al It is certified that error appears in the above-identified patent and that said Letters Patent is hereby corrected as shown below:

Column 10, line 57; change "isocyante" to ---isocyanate---.

Column 11, line 2; change "diisocyante" to ---diisocyanate---.

Column 11, line 3; change "socyante" to ---socyanate---.
change "diisocyante" to ---diisocyanate---.

Column 11, line 4; change "diisocynate" to ---diisocyanate---.
change "diisocyante" to ---diisocyanate---.

UNITED STATES PATENT AND TRADEMARK OFFICE
CERTIFICATE OF CORRECTION

PATENT NO. : 4,619,970
DATED : October 28, 1986
INVENTOR(S) : Yoshio OKAMOTO et al It is certified that error appears in the above-identified patent and that said Letters Patent is hereby corrected as shown below:

Column 11, line 5; change "diisocyante" to
---diisocyanate---.

Column 11, line 6; change "1,4-benzenediisocyante" to
---1,4-benzenediisocyanate---.

Column 11, line 7; change "diisocyante" to
---diisocyanate m-phenylene diisocyanate, isoporone diisocyanate,---.

Column 11, line 8; change "isocyante" to ---isocyanate---.
line 11; change "isocyanto" to ---isocyanato---.

Signed and Sealed this

Twenty-eighth Day of April, 1987

Attest:

DONALD J. QUIGG

*Attesting Officer*    *Commissioner of Patents and Trademarks*